United States Patent [19]

Kaden

[11] Patent Number: 5,150,868
[45] Date of Patent: Sep. 29, 1992

[54] EXTENSIBLE INTERJOIST HANGER SUPPORT ASSEMBLY

[76] Inventor: Milton E. Kaden, 446 Audrey Dr., Richmond Heights, Ohio 44143

[21] Appl. No.: 690,811

[22] Filed: Apr. 23, 1991

[51] Int. Cl.⁵ ............................................. H02G 3/08
[52] U.S. Cl. .................................... 248/343; 248/57; 248/200.1; 248/546
[58] Field of Search ...................... 248/343, 200.1, 57, 248/546, 27.1, 906

[56] References Cited

U.S. PATENT DOCUMENTS

| | | | |
|---|---|---|---|
| 4,463,923 | 8/1984 | Reiker | 248/57 |
| 4,659,051 | 4/1987 | Propp | 248/57 |
| 4,682,452 | 7/1987 | Propp | 248/57 |
| 4,909,405 | 3/1990 | Kerr, Jr. | 248/57 |
| 5,044,582 | 9/1991 | Walters | 248/57 |

*Primary Examiner*—Robert W. Gibson, Jr.
*Attorney, Agent, or Firm*—Tarolli, Sundheim & Covell

[57] ABSTRACT

An extensible hanger support is provided for use in providing a spanning connection between two spaced apart joints or the like for supporting therefrom such items as ceiling fans, light fixtures and the like. The support includes first and second extensible members which are telescopically axially movable between a fully collapsed condition and a fully extended condition. These extensible members employ cooperative means which are normally in threaded engagement in such a manner that rotation of one of the members relative to the other results in axial movement toward either the fully collapsed condition or the fully extended condition depending upon the direction of rotation. Each of these extensible members has a free end which carries joist engaging means for respectively engaging a ceiling joist. The cooperative means includes quick release means for quickly releasing the members from their normal threaded engagement with each other while permitting quick sliding axial movement relative to each other only in response to axially applied forces to cause the members to extend toward their fully extended condition while permitting axial movement in the opposite direction only in response to rotational movement in a direction causing said members to be displaced to the collapsed condition.

10 Claims, 7 Drawing Sheets

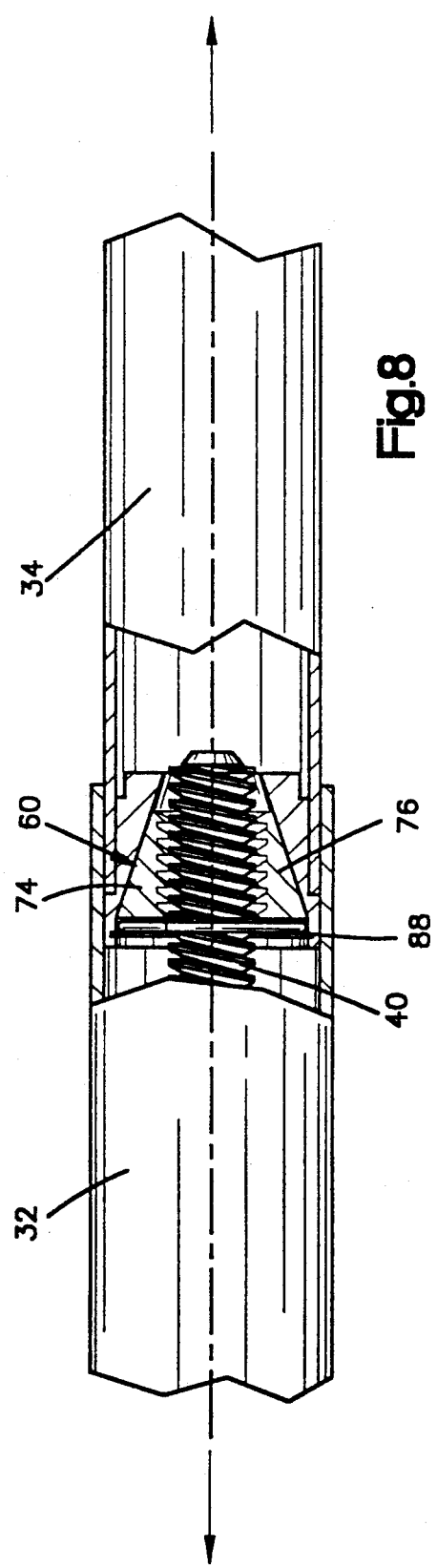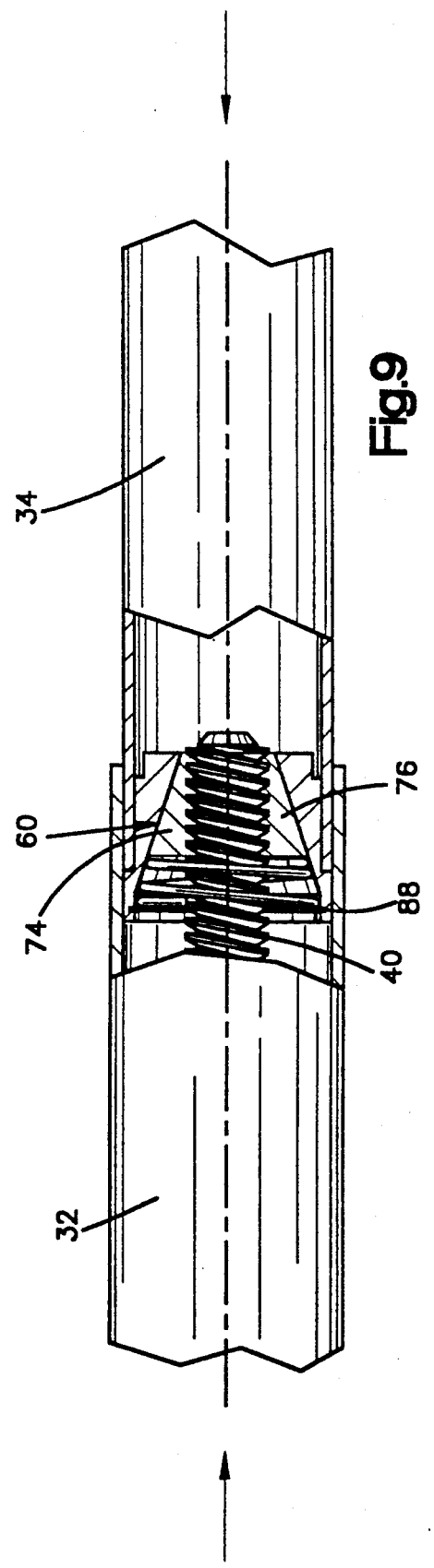

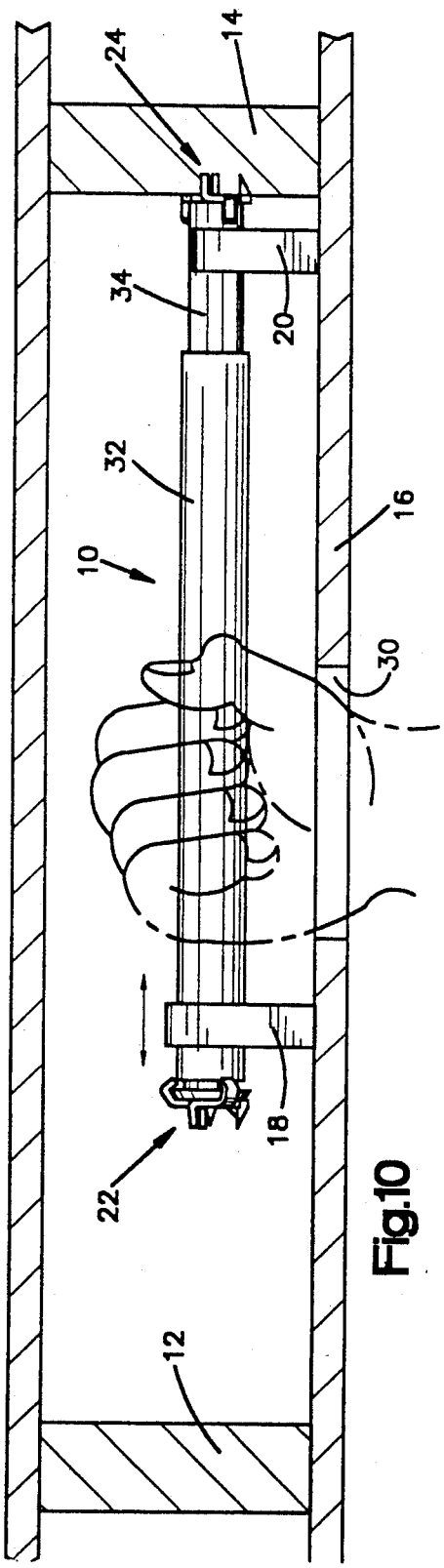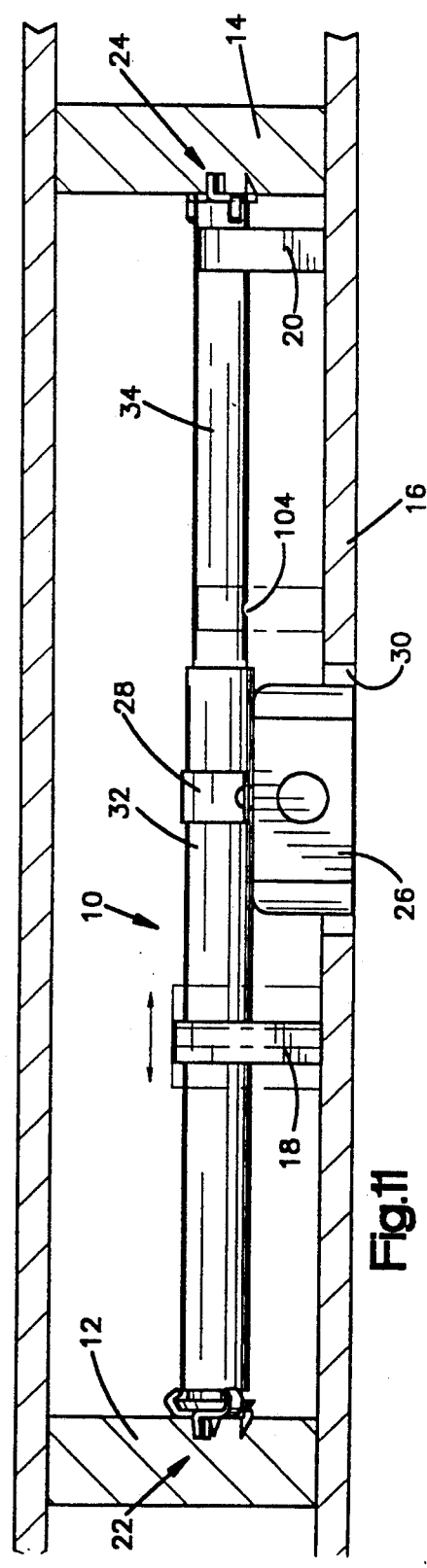

EXTENSIBLE INTERJOIST HANGER SUPPORT ASSEMBLY

BACKGROUND AND FIELD OF THE INVENTION

The present invention relates to the art of hanger supports for suspending heavy objects such as ceiling fans, light fixtures and the like from a support extending between a pair of spaced ceiling joists and the like.

Interjoist hanger supports are well known in the art for supporting the weight of a fan or lighting fixture and the like between a pair of ceiling joists. Frequently, such supports are installed above a ceiling and between floors of a multi-story structure. In such situations, a standard electrical outlet box cannot be directly mounted to a ceiling and support a significant load, such as that presented by a ceiling fan which may have a weight on the order of 10 pounds to 65 pounds. Instead, an interjoist hanger support is mounted between the floors of a multi-story structure and extends transversely between a pair of ceiling joists above a hole placed in the ceiling. Thereafter, an electrical outlet box may be suspended from the support and which, in turn, will support the fan or other relatively heavy fixture, such as a light fixture and the like.

Examples of prior art interjoist hanger supports include those described in the K. H. Reiker U.S. Pat. No. 4,463,923 and J. R. Kerr U.S. Pat. No. 4,909,405.

The hanger support disclosed in the Reiker patent includes two telescopically extensible members which are in threaded engagement with each other so that the members are movable between a fully collapsed condition and a fully extended condition by rotating the members relative to each other. The free ends of the telescopically extensible members carry prongs which are driven into opposing surfaces of a pair of ceiling joists and are held in place by exerted jack screw forces as the members are extended toward their fully extended length. Reiker also provides spacers fixed to the free ends of the extensible members which engage the upper surface of a ceiling so that the hanger support extends parallel to the ceiling and is spaced therefrom by a fixed distance, on the order of two inches.

One of the problems of employing an interjoist hanger support constructed as illustrated in the Reiker patent involves the amount of time required to install such a hanger support. Typically, such an interjoist hanger support is supplied by the manufacturer in its collapsed condition in which the support has an overall length on the order of fourteen inches. If the ceiling joists are spaced by a distance on the order of twenty-four inches, then the hanger support must be extended substantially before it can be installed in place between a pair of ceiling joists. Because of the threaded connection between the two telescopically extensible members, a substantial amount of time is required by an installer to extend the members prior to positioning the spacer so that it extends transversely between a pair of spaced apart ceiling joists and then further extended by rotational forces to cause the joist engaging prongs or the like on the free ends of the extensible members to be driven into the spaced apart ceiling joists.

A still further problem in using an interjoist hanger support such as disclosed in the Reiker patent is that, when the extensible members are in their fully extended condition, there is a tendency for the center part of the support to sag somewhat toward the upper surface of the ceiling. This results in a tendency for the joist engaging prongs or the like mounted on the free ends of the extendible members to become loose and to disengage from the ceiling joists. The spacers extending from the free ends of the hanger support in the Reiker patent are not adjustable in an axial direction to distribute some of the load to a portion of the ceiling closer to the center of the spacer which would relieve the tendency for the spacer to sag and for the end prongs to disengage from the ceiling joists.

The Kerr patent employs a pair of telescopically extensible members which are axially slidable relative to each other and are not in threaded engagement. Thus, while the two members may be rapidly displaced in an axial direction from a collapsed condition to a fully extended condition, there is no threaded engagement between the members to achieve the jack screw forces provided by the hanger support disclosed in the Reiker patent. Moreover, when the device disclosed in the Kerr patent is in its fully extended position, it will have a tendency to sag somewhat because, like that in the Reiker patent, the device disclosed in the Kerr patent employs spacers that are mounted to the free ends of the extensible members and the spacers are not axially movable so that the load may be shifted somewhat toward the center portion of the hanger support.

A still further problem in employing an interjoist hanger support such as that disclosed in the Kerr patent relates to the difficulty in mounting an electrical outlet box so as to be suspended from the hanger support. This is particularly difficult when this is attempted with one hand extended up through an opening in a ceiling. Thus, when employing a device as described in the Kerr patent, the hanger support is interconnected between a pair of spaced apart ceiling joists above an opening in the ceiling. Then with one hand an electrical outlet box is attached to the mid portion of the hanger support. This is accomplished by attaching a saddle bracket over the hanger support with the saddle bracket having a pair of outwardly extending flanges having mounting apertures therein. An electrical junction box is then mounted to the flanges with screws and nuts. This presents substantial difficulty, as the screws, which are mounted in the apertures in the saddle flanges, tend to become dislodged while attempting to secure the outlet box in place by means of nuts to be threaded onto the threaded portion of the screws.

SUMMARY OF THE INVENTION

This invention is directed toward an improved interjoist hanger support incorporating features for use in overcoming the noted disadvantages of the prior art as discussed above. These improvements include an extensible hanger support which maintains the desirable features of a threaded interconnection between extensible members which are telescopically movable along an axis between fully collapsed and fully extended conditions, while at the same time permitting rapid slidable movement therebetween for quickly extending the members from a fully collapsed condition to a fully extended condition. Another feature incorporated herein provides a pair of axially movable spacers for spacing a hanger support by a fixed amount from the upper surface of the ceiling while at the same time providing axially adjustable movement of the spacers so as to distribute the loading to minimize sagging, particularly when the spacer bar is in its essentially fully extended condition. Another feature of the invention herein is the employment of electrical box mounting screws which extend downwardly from side flanges of the saddle brackets mounted on a spacer bar with the mounting screws being provided with resilient O-rings to prevent the screws from being dislodged during one-handed installation of attaching an electrical outlet box to the saddle flanges with use of nuts to be threaded onto the screws.

In accordance with one aspect of the present invention, an extensible hanger support is provided for use in providing a spanning connection between two spaced apart ceiling joints or the like for supporting therefrom such items as ceiling fans, light fixtures and the like. The support includes first and second extensible members which are telescopically movable between a fully collapsed condition and a fully extended condition. These extensible members employ cooperative means which are normally in threaded engagement in such a manner that rotation of one of the members relative to the other results in axial movement toward either the fully collapsed condition or the fully extended condition depending upon the direction of rotation. Each of these extensible members has a free end which carries joist engaging means for respectively engaging a ceiling joist. The cooperative means includes quick release means for quickly releasing the members from their normal threaded engagement with each other while permitting quick sliding axial movement relative to each other only in response to axially applied forces to cause the members to extend toward their fully extended condition while permitting axial movement in the opposite direction only in response to rotational movement in a direction causing said members to be displaced to the collapsed condition.

In accordance with another aspect of the present invention, an extensible interjoist hanger support is provided for spanning between a pair of spaced apart joists and the like having opposing surfaces. The support includes first and second extensible members which are telescopically movable in opposing axial directions between a fully collapsed length and a fully extended length. Each of the extensible members has a free end carrying joist-engaging means for engaging one of the opposing surfaces of a pair of joists. Additionally, each member carries a spacer such that, in assembly with the joist-engaging means in engagement with opposing surfaces of a pair of ceiling joists, the hanger support is spaced vertically above the ceiling. The spacers are axially movable so that loading on said hanger support may be adjustably distributed to various points on the ceiling.

In accordance with a still further aspect of the present invention, an extensible interjoist hanger support is provided for spanning between a pair of spaced apart ceiling joists having opposing surfaces. A pair of extensible members are telescopically movable in opposing axial direction between a collapsed length and a fully extended length. Each of these extensible members has a free end carrying a joist-engaging means for engaging one of the opposing surfaces of a pair of joists. A mounting saddle bracket is releasably mounted on the support with the saddle bracket having a pair of oppositely directed mounting flanges to which an electrical outlet box may be secured. The flanges are provided with apertures for carrying a pair of screws which extend downwardly through the respective apertures. The outlet box is then positioned so that the screws extend through a pair of cooperating holes in the outlet box and then held in place with a pair of nuts threaded onto the threaded ends of the screws. Each of the screws is located so that it extends downwardly through an aperture in a saddle flange with the screw being prevented from dislodgement by an O-ring carried by the screw on the lower side of the flange. This serves to prevent the screw from becoming dislodged from the flange while the nut is being threaded onto the screw securing the electrical outlet box to the saddle bracket.

BRIEF DESCRIPTION OF THE DRAWINGS

The foregoing and other objects and advantages of the present invention will become more readily apparent from the following description as taken in conjunction with the accompanying drawings, wherein:

FIG. 8 is a view similar to that of FIG. 7, but showing the operation that ensues when opposing axial forces are applied in a direction to extend the hanger support;

FIG. 9 is a view similar to that of FIGS. 7 and 8, but showing the operation that ensues when axial forces are applied in opposing direction tending to collapse the hanger support;

FIG. 10 is an elevational view partly in section show the manner of installing the hanger support to a pair of spaced ceiling joists; and FIG. 11 is a view similar to that of FIG. 10, but showing the hanger support in place with both of its free ends having means in engagement with the opposing surfaces of a pair of ceiling joists.

DESCRIPTION OF PREFERRED EMBODIMENT

Figure 1:
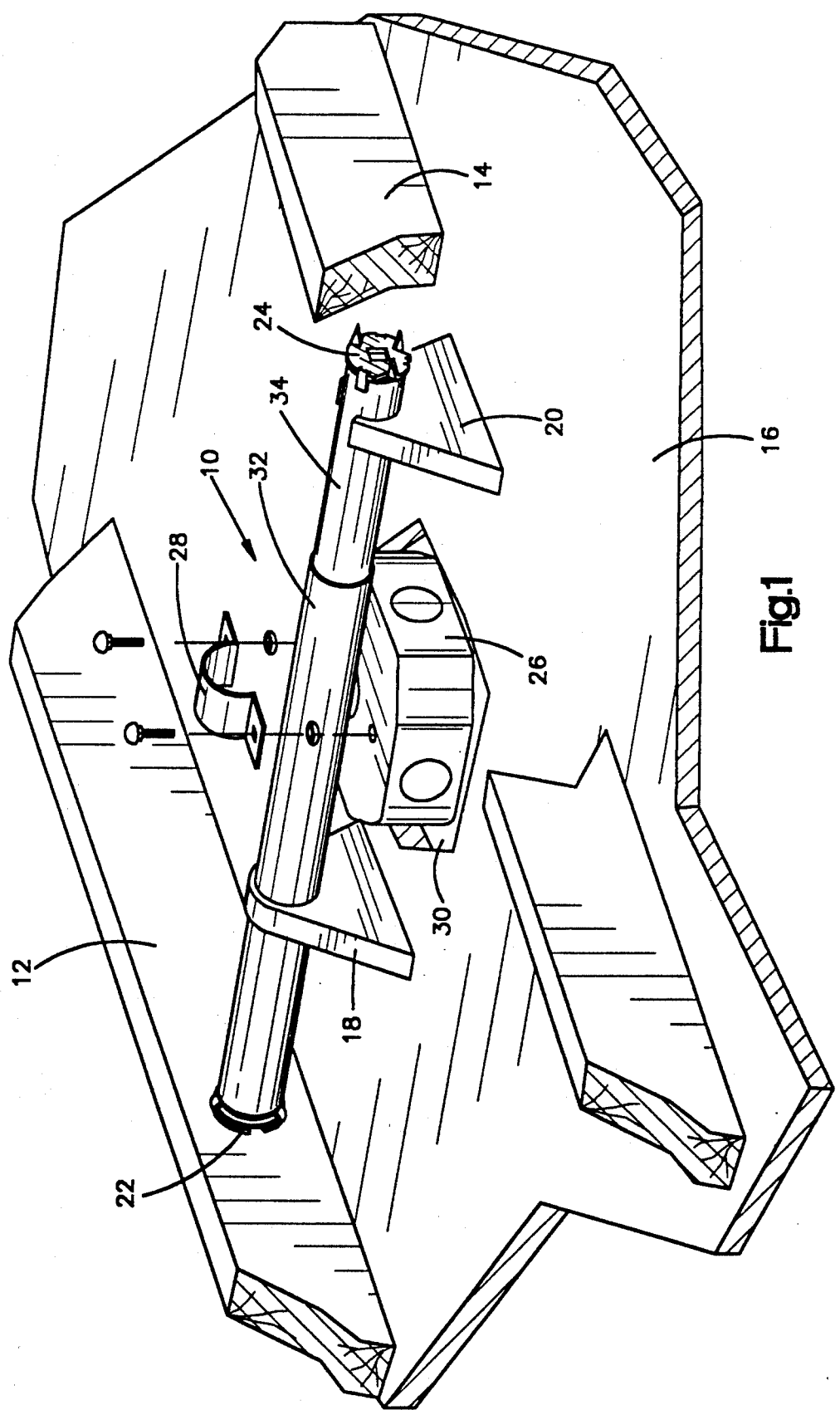
FIG. 1 is a perspective view of one embodiment of the hanger support in accordance with the present invention.

One application of the present invention is illustrated in FIG. 1 wherein a hanger support 10 constructed in accordance with the invention extends between a pair of ceiling joists 12 and 14 in an interfloor location above a ceiling 16. The hanger support 10 extends transversely between the joists 12 and 14 and is spaced above the ceiling 16 so as to be essentially parallel therewith by means of a pair of spacers 18 and 20. The extended or free ends of the hanger support 10 carry joist-engaging prongs 22 and 24 which respectively engage the facing surfaces of ceiling joists 12 and 14. An electrical outlet box 26 is suspended from the hanger support 10 and secured thereto by means of a saddle bracket 28 and appropriate fastening means to be discussed in greater detail hereinafter. The electrical outlet box 26 extends through an opening 30 in the ceiling 16. As is conventional, the outlet box 26 mounts a relatively heavy fixture such as a light fixture or a ceiling fan which then hangs from the hanger support 10.

Having now provided a general description of the application of the present invention, the following is a more detailed description of the hanger support 10 as taken in conjunction with the drawings herein.

The hanger support 10 is preferably constructed of metal exhibiting sufficient strength and rigidity to support a fixture such as a ceiling fan, which may weigh on the order of 10 to 65 pounds. In its fully collapsed condition, as shown in FIG. 10, the hanger support has a length on the order of 14 inches, whereas in its fully extended condition, as shown in FIG. 11, it has a length on the order of 23 inches. Whereas the hanger support is preferably constructed of metal, it is to be noted that the spacers 18 and 20 may be constructed of light weight material, such as plastic.

The hanger support 10 includes a pair of telescopically extensible tubular portions 32 and 34 with tubular portion 32 coaxially surrounding, a portion of the length of portion 34 and being of dimensions to permit axial slidable movement of one relative to the other.

Tubular portions 32 and 34 are interconnected by means of a threaded rod and nut arrangement which cooperate to normally provide a threaded engagement with one another such that rotation of either tubular portion 32 or 34 results in axial movement of the tubular portions between their fully collapsed length, as in FIG. 10, to a fully extended length (as is approached in FIG. 11).

Figure 2:
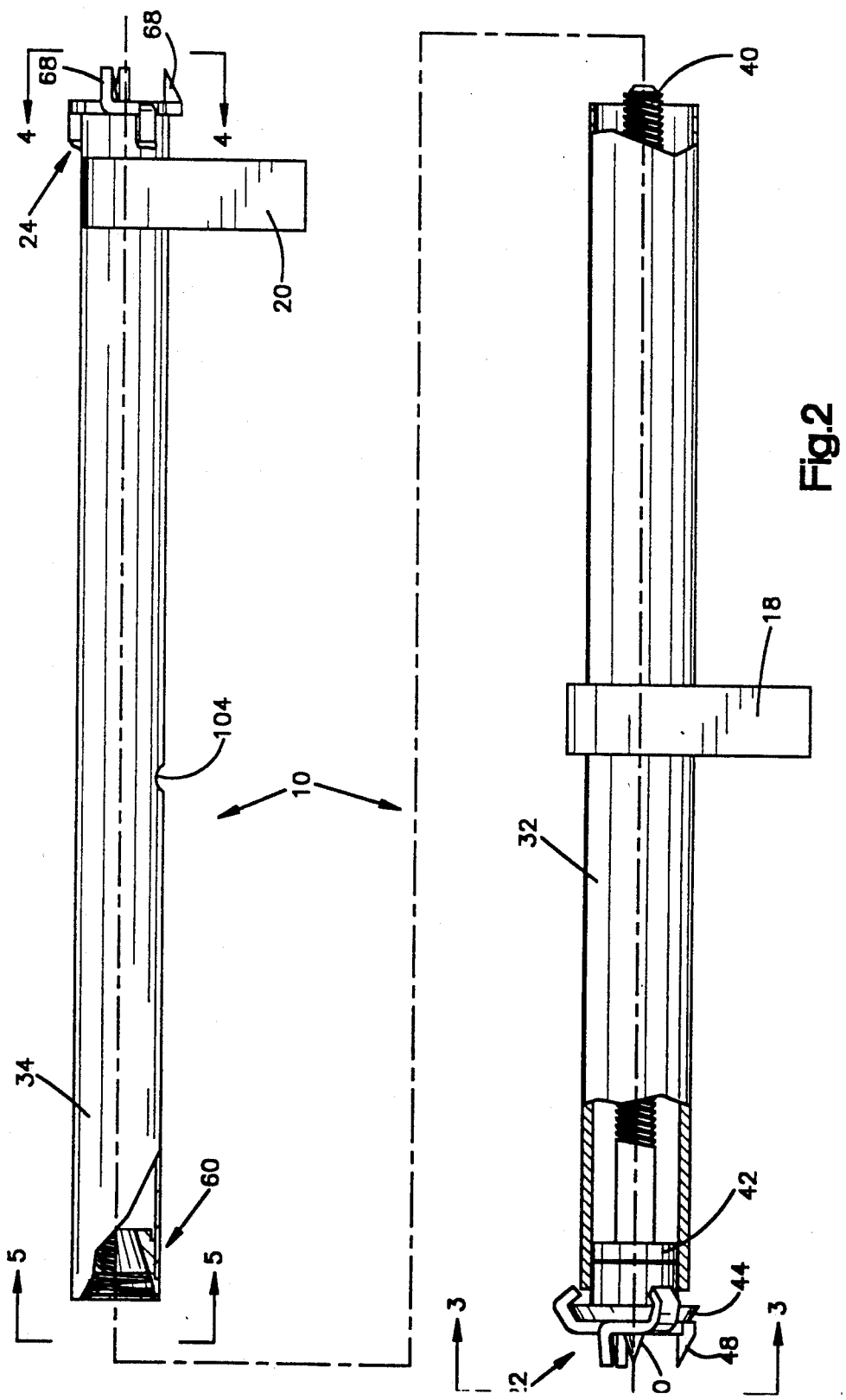
FIG. 2 is an enlarged elevational view with parts broken away of the hanger spacer illustrated in FIG. 1.

Tubular portion 32 carries and coaxially surrounds a threaded rod 40 which is co-extensive with the length of the tubular portion 32. The rod 40 has a cap 42 secured thereto at one end, as with a pin extending therethrough. The cap 42 has a cylindrical outer surface which is press fit to the inner circumferential surface of one end of the tubular portion 32. The cap 42 has a flared end 44 spaced from tubular portion 32 by a short distance and the flared end 44 carries a prong assembly 22 so that the prong assembly is held in place against axial movement but is free to rotate about the axis of rotation of the tubular portion 32. The prong assembly 44 includes spaced apart prongs 48 which serve to engage and then dig into a ceiling joist, such as joist 12, when forces are applied such as jack screw forces as rod 40 is turned in a direction causing the hanger support to be driven toward its fully extended condition. It is during this operation that the tubular portion 32 may rotate relative to the prong assembly 22. It is to be noted from FIGS. 2 and 3 that a conically shaped prong 50 extends from cap 42 through a circular shaped aperture 52 (see FIG. 3) in the prong assembly 22 and which may make engagement and protrude into a ceiling joist, such as joist 12, during assembly.

The threading provided on the threaded rod 40 extends from the distal end of the rod toward the cap 42 for most of the length of the rod. As will be discussed in greater detail hereinafter, this threading is preferably of a type known as a buttressed thread. The other tubular portion 34 carries a threaded nut assembly 60 at its inner end and which assembly, as will be described in greater detail hereinafter, is normally in threaded engagement with the threaded rod 40 so that rotation of either tubular portion 32 or 34 will cause the tubular portions to move inwardly toward their fully collapsed length, or outwardly toward their fully extended length. The nut assembly 60 will be discussed in greater detail hereinafter in conjunction with its quick release function permitting quick release from the threaded engagement with the threaded rod 40.

Figure 4:
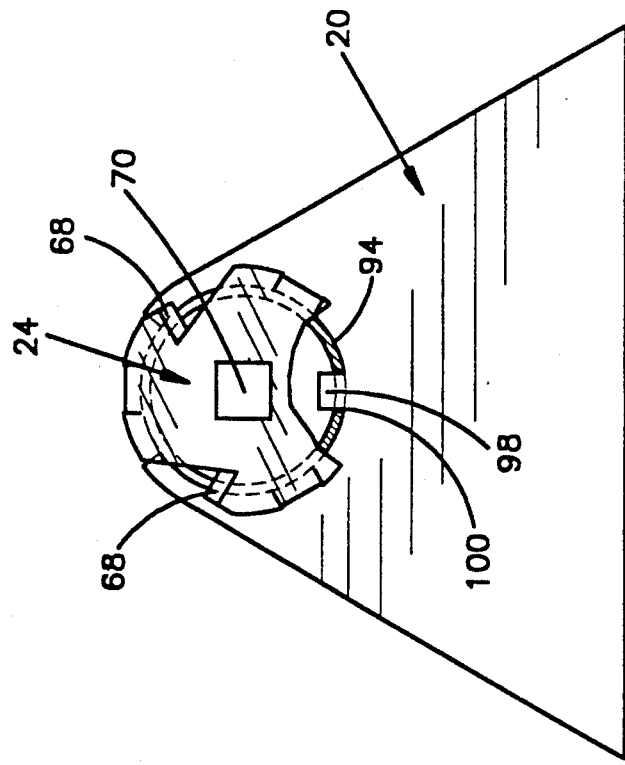
FIG. 4 is a view taken along line 4—4 looking in the direction of the arrows of FIG. 2.

The outer free end of the tubular portion 34 carries a prong assembly 24 for engagement with a ceiling joist, such as joist 14 (FIGS. 1, 10 and 11). This prong assembly is fixed, as by welding, to the tubular portion 34 unlike the loose rotational relationship of prong assembly 22 to the tubular portion 32. The prong assembly 24 includes a plurality of prongs 68 which are adapted to engage and then dig into a ceiling joist, such as joist 14, particularly when jack screw forces are applied when the tubular portions 32 and 34 are rotated relative to each other in a direction causing axial movement of the members toward their fully extended length. As best shown in FIG. 4, the prong assembly 24 is provided with a central square-shaped aperture 70. This permits use of a tool, such as a screwdriver or a power drill, to make a driving connection with the tubular portion 34 by way of the square-shaped aperture 70 so as to rapidly rotate the tubular portion 34 relative to tubular portion 32 to achieve relative axial movement therebetween, such as when collapsing the hanger spacer during the packaging of the product.

In accordance with one aspect of the present invention, a quick release means is provided for quickly releasing the normal threaded engagement between the nut assembly 60 and the threaded rod 40. This permits quick slidable axial movement in response to axially applied forces in directions to move the tubular portions 32 and 34 from their collapsed length toward their fully extended length. Also, during this operation only rotational threaded engagement is permitted in the opposite axial directions towards the collapsed length of the hanger support. This feature permits an installer to more rapidly install the hanger support in place between a pair of ceiling joists. It is contemplated that manufacturers of telescopically extensible hanger supports provide such supports in a collapsed condition because of packaging requirements. Assuming the total length of a hanger support is on the order of 13 to 14 inches, this may require only a minimal number of turns to extend the hanger support a sufficient length to be used between ceiling joists that are spaced on the order of 16 inches apart. However, if the ceiling joists are spaced apart by a greater distance, such as on the order of 24 inches, then the additional time to rotate the members through their threaded engagement to extend the hanger support to essentially its fully extended length prior to installation will require a substantial amount of time. To alleviate this, the present invention provides such a hanger support with a quick release means for quickly releasing the telescopic members from their normal threaded engagement and permit relatively fast slidable axial movement of the members relative to each other. This is achieved with the structure as described below.

Figure 7:
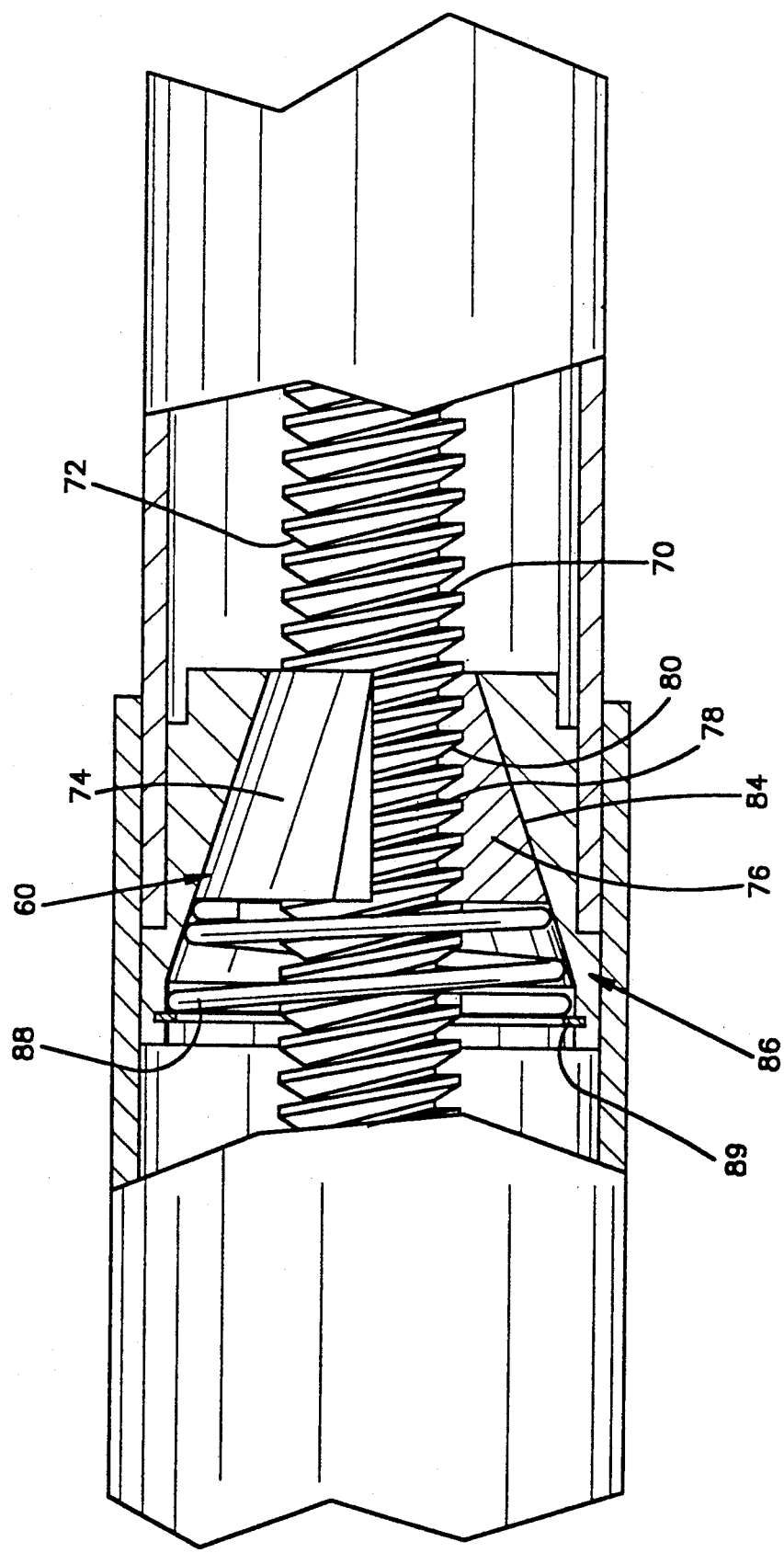
FIG. 7 is an enlarged elevational view of a portion of the length of the hanger support with parts broken away illustrating a threaded rod and a split nut and other components in conjunction with a quick release mechanism of the present invention.

The discussion that follows is directed to the threaded rod 40 and the nut assembly 60 as best depicted in FIGS. 7, 8 and 9. As shown there, the rod 40 is provided with threads providing a helical external thread convolution having a flat leading side or flank 70 which extends generally perpendicular to the longitudinal central axis of the thread convolution, and a threaded cam side or flank 72 which extends at an acute angle of approximately 45° relative to the longitudinal central axis of the thread convolution.

The nut assembly 60 employs a helical internal thread convolution and the nut is formed in two segments 74 and 76 (see FIG. 5) defining a split nut. Each segment has a portion of a helical internal thread convolution. The split nut segments 74 and 76 have an external surface which forms a portion of a cone having the same axial taper as the internal surface 84 on the sleeve 86. The internal thread convolution is configured to match the external thread convolution on the threaded rod 40. Thus, the internal thread convolution has a flat leading side or flank 78 which extends generally perpendicular to the longitudinal central axis of the internal thread convolution and a trailing cam side or flank 80 which extends at an acute angle of approximately 45° to the longitudinal central axis of the internal thread convolution.

When an axial force is applied to the threaded rod 40 in a direction toward the split nut (from left to right in FIGS. 7, 8 and 9), the flat leading flank 70 of the external thread convolution on the rod 40 abuts the flat leading flank 78 of the internal thread convolution on the segments 74 and 76 of the split nut 60. This forces the segments of the split nut toward the inwardly tapering end of the locking surface 84 on the sleeve 86 which surrounds nut segments 74 and 76. Thus, the sleeve 86 presses the nut segments 74 and 76 toward each other to cause the internal thread convolution on the nut segments to tightly engage the external thread convolutions on the rod 40. This prevents axial slidable movement of the rod relative to the nut segments, but does permit rotational threaded movement of the rod relative to the nut segments permitting axial displacement of the tubular portions 32 and 34 toward their collapsed condition.

When an axial force is applied to the rod in a direction away from the split nut (from right to left as viewed in FIGS. 7, 8 and 9), the cam side or flank 72 of the external thread convolution on the rod 40 abuts the cam side or flank 80 on the internal thread convolution on the split nut segments 74 and 76. This results in the split nut 60 being pulled toward the outwardly flaring end of the internal surface of the sleeve 86. As the split nut moves toward the outwardly flaring end, a coiled spring 88 is suitably held in place between the split nut 60 and the flared opening of the sleeve 86 by means of an annular ring 89 causing the spring to become compressed. At the same time, the nut segments 74 and 76 move radially apart to enable the crest of the external thread convolution on the threaded rod to move past the crest of the internal thread on the nut segments 74 and 76 (as is best seen in FIG. 8). This enables the tubular portions 32 and 34 of the hanger support 10 to be pulled apart by axial forces alone without rotating the split nut and rod relative to each other. This serves as a quick release means for quickly releasing tubular portions 32 and 34 from their normal threaded engagement so that they may be quickly pulled apart to expand from a collapsed condition to a fully extended condition by applying axial forces alone. This feature permits more rapid installation of such hanger spacers than that known heretofore.

Figure 3:
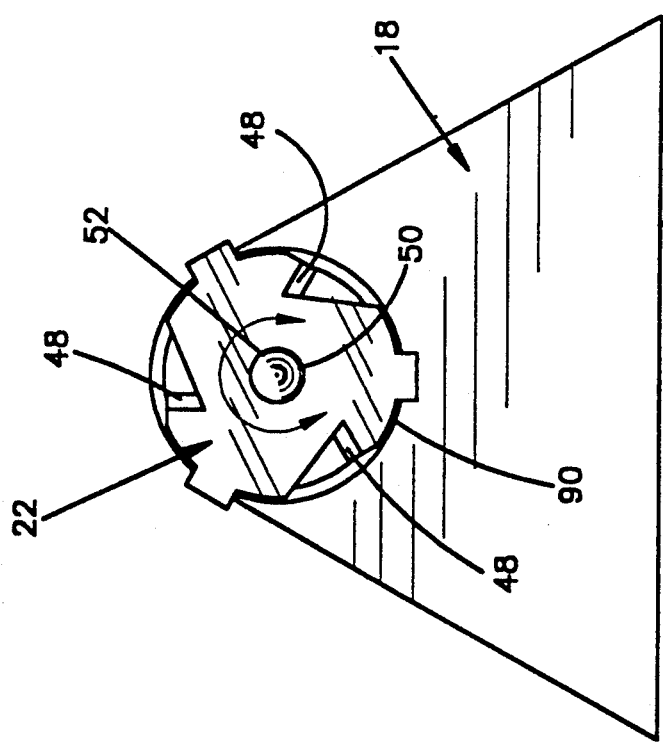
FIG. 3 is a view taken along line 3—3 looking in the direction of the arrows in FIG. 2.

During installation, it is contemplated, particularly with existing homes, that ceiling 16 will be provided with an opening 30, such as a four inch round hole, through which the hanger support will be inserted for mounting between a pair of ceiling joists, such as joists 12 and 14. The spacers 18 and 20 may be mounted on the hanger support prior to inserting the support through the opening 30 to the space above ceiling 16. As best shown in FIGS. 3 and 4, each of the spacers is somewhat triangular in shape and each has a circular opening near one apex for receiving a portion of the length of the hanger support 10. Specifically, spacer 18 is provided with a circular opening 90 which slidably receives a portion of the length of tubular portion 32. The fit is such that tubular portion 32 may be rotated within the opening 90 while the relatively flat lower surface 92 of the spacer sits flat against the upper surface of ceiling 16. This will allow tubular portion 32 as well as the threaded rod 40 to be rotated. Also, portion 32 may slide axially through the opening 90.

Figure 5:
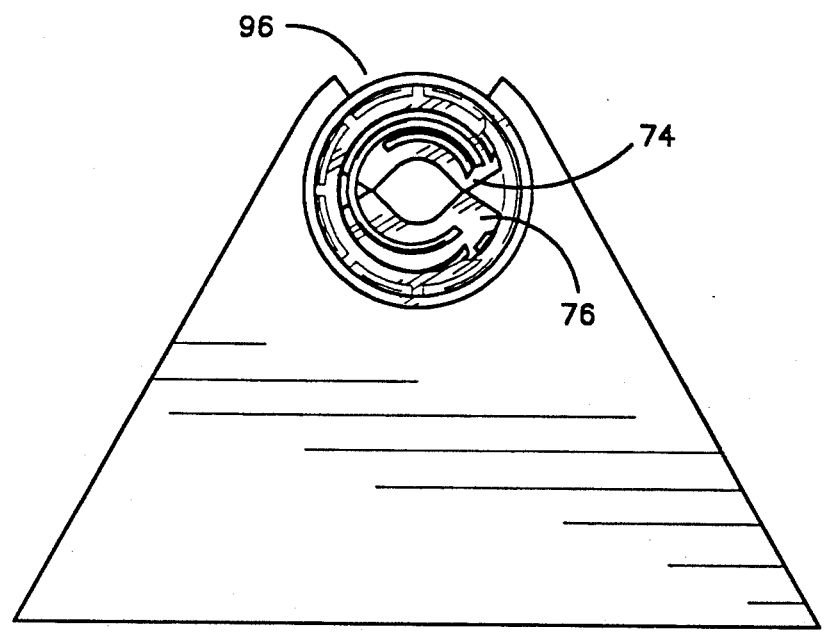
FIG. 5 is a view taken along line 5—5 looking in the direction of the arrows in FIG. 2.

The other spacer 20 is provided with a partial circular opening 94 which does not surround tubular portion 34, but permits the tubular portion to be snapped into place by way of an upper opening 96 (see FIGS. 4 and 5). Opening 94 is also provided with an upstanding boss 98 which, in assembly, is received within a hole 100 in the tubular portion 34. This prevents the tubular portion 34 from rotating about its axis when the spacer 20 is mounted with its lower surface 102 flush against the upper surface of ceiling 16.

With the hanger support being in place above ceiling 16 and with the spacers 18 and 20 being mounted to the support, the joist-engaging prong assembly 24 may be pressed against ceiling joist 14. Thereafter, with one hand an installer may rotate the tubular member 32 and the threaded rod 40 in such a direction causing the support to extend toward its fully extended length. As the hanger support is being extended, the rotatable joist engaging means 22 will engage the ceiling joist 12 and the prongs 48 will penetrate the wood as additional jack screw forces are applied by the operator continuing to rotate the tubular portion 32. The operator will continue to rotate tubular portion 32 until it is apparent that both of the joist-engaging assemblies 22 and 24 have made firm engagement with the ceiling joists 12 and 14. It is to be noted that during the rotation of tubular portion 32, the tubular portion 34 is prevented from rotating by the boss 98 on spacer 20 extending through the aperture 100 in the tubular portion 34. It may be desirable to adjust the axial location of spacers 18 and 20. This may be desirable particularly where the joists 12 and 14 are spaced by 24 inches as opposed to a normal 16 inches. In such case, it may be desirable to displace the spacer 18 from a location close to the free end of tubular portion 32 to a location closer to the hole 30 in the ceiling 16, such as the position shown by the dotted line of spacer 18 in FIG. 11. Correspondingly, it may be desired to also axially displace the spacer 20 from the location as shown by the solid lines in FIG. 11 to that as shown by the dotted line in FIG. 11. Tubular portion 34 is provided with a second hole 104 for receiving boss 98 on spacer 20. Consequently, spacer 20 may be disengaged from tubular portion 34 at the location shown by the solid lines in FIG. 4 and positioned to the location shown by the dotted lines with the boss 98 extending into aperture 104 instead of aperture 100 to thereby hold the hanger support 34 in place and in a manner to prevent it from rotating about its axis. Such movement of the spacers 18 and 20 permits the installer to distribute the loading as desired.

Figure 6:
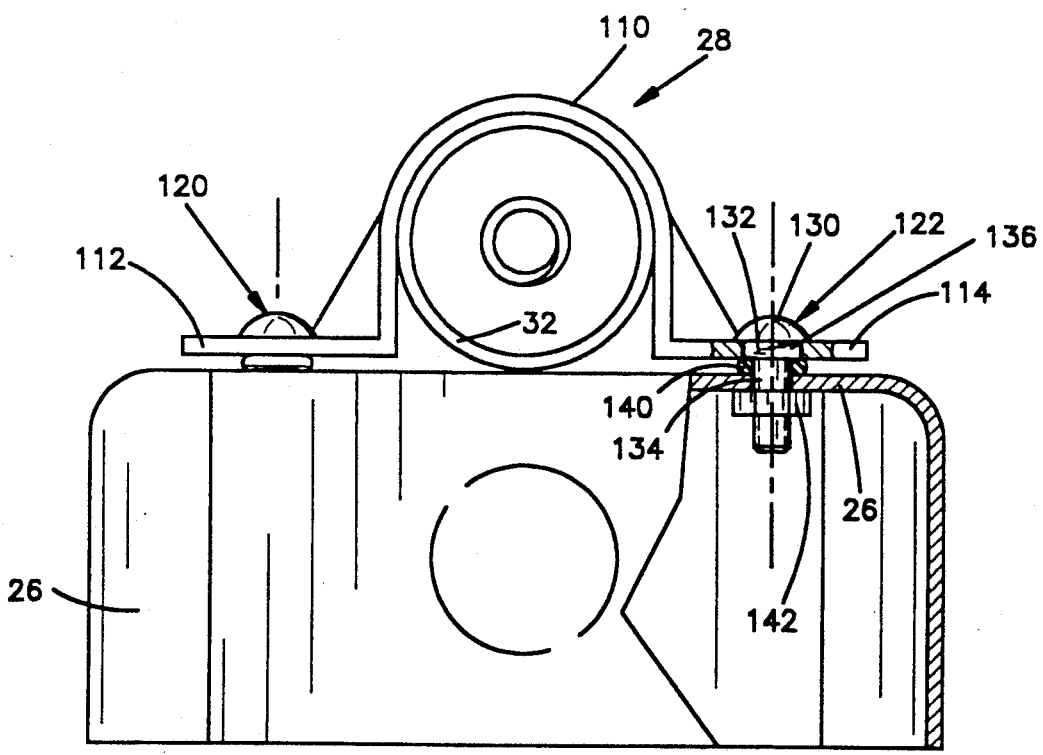
FIG. 6 is an enlarged end view illustrating the hanger support of FIG. 1 having an electrical outlet box mounted thereto by means of a snap saddle and fastening means.

With the hanger support in place between the ceiling joists 12 and 14 as shown in FIG. 1 and 11, the installer will now mount the electrical outlet box 26 so as to be suspended from the hanger support 10 with the assistance of a saddle bracket 28. As best seen in FIGS. 1 and 6, the saddle bracket 28 includes a central inverted U-shaped portion 110 and outwardly extending side flanges 112 and 114. The central portion 110 is adapted to snap onto a portion of the length of tubular portion 32 with a snap fit. The electrical outlet box 26 is secured to the flanges 112 and 114 by fastener assemblies 120 and 122 to be described in detail below. A lighting fixture or ceiling fan or the like is then connected to the electrical outlet box 26 and thereby suspended from the hanger support 10.

Each of the fastener assemblies 120 and 122 includes a screw having a rounded head or cap 130 mounted at one end of a square shank 132. Extending away from the square shank 132 there is provided a threaded portion 134. Each of the flanges, such as flange 112, is provided with a square aperture 136 which is fitted to receive the square shank 132 in such a manner as to prevent rotational movement of the screw about its axis of rotation. This, then, will hold the screw in place during fastening operations providing that the screw does not dislodge in a vertical sense from the square aperture 136. As shown in FIG. 6, an O-ring 140 is carried on the threaded portion 134 of the screw just below the square shank 132. This O-ring is located between flange 114 and the upper wall of the outlet box 26. Consequently, when the installer is attaching a nut 142 to the free end of the screw below the electrical outlet box 26, there may be a tendency to dislodge the screw in an upward direction so that the square shank 132 is dislodged from the square hole 136. If this were to occur, the operator would not be able to install the nut 142 onto the screw to tighten the connection between the outlet box 26 and the flange 112. The O-ring 140 prevents the screw from being dislodged in an upward direction sufficient for the square shank 132 to be dislodged from the square hole 136. Consequently, the operator using but one hand is able to install a nut 142 onto the screw with the screw being prevented from being dislodged from the aperture 136 during the installation process. This feature saves considerable installation time.

Although the invention has been described in conjunction with a preferred embodiment, it is to be appreciated that various modifications may be made without departing from the spirit and scope of the invention as defined by the appended claims.

Having described the invention, the following is claimed:

1. An extensible interjoist hanger support assembly for spanning between a pair of spaced-apart joists having opposing surfaces, comprising:
    first and second telescopically extensible members movable in opposing axial directions between a fully collapsed length and a fully extended length, said members having cooperative means normally in threaded engagement with one another such that rotation of either of said members relative to the other results in axial movement between said fully collapsed length and said fully extended length;
    each said member having a free end carrying joist-engaging means for engaging one of said opposing surfaces of a pair of said joists; and
    said cooperative means including quick release means for releasing said members from said threaded engagement while permitting quick slidable axial movement of said members relative to each other in response to axially applied forces in opposing directions to cause said members to move toward said fully extended length while permitting only rotational threaded movement to achieve movement in the opposite axial direction toward said collapsed length.

2. An extensible interjoist support assembly as set forth in claim 1 including an elongated rod secured to said first extensible member and having threading thereon for a substantial portion of its length, nut means carried by said second extensible member and normally in threaded engagement with said threaded rod so that rotational movement of either of said members relative to each other results in axial movement between said fully collapsed length and said fully extended length.

3. An extensible interjoist support assembly as set forth in claim 2 wherein said nut means includes a pair of nut segments having internal threads which are normally in threaded engagement with said threaded rod.

4. A hanger support assembly as set forth in claim 3 wherein said release means includes means responsive to outwardly directed axial forces tending to pull said members in opposing directions to cause said nut segments to be spread apart in opposing radial directions permitting axial slidable movement between said extensible members.

5. A hanger support assembly as set forth in claim 4 wherein said release means includes a sleeve carried by said second extensible member and coaxially surrounding said nut segments.

6. A hanger support assembly as set forth in claim 5 wherein said sleeve has an internal surface which has inwardly tapering walls extending in a first axial direction and wherein said nut segments have an external surface with inwardly tapering walls extending in said first axial direction.

7. A hanger support assembly as set forth in claim 6 including spring means for applying resilient forces against said nut segments in said first axial direction to cause said nut segments to normally be in threaded engagement with said threaded rod.

8. A hanger support assembly as set forth in claim 1 including a saddle bracket carried by said support assembly, said saddle bracket having a pair of outwardly extending flanges to which an electrical outlet box may be secured, fastening means for securing said outlet box to said flanges and including a pair of nut and bolt assemblies each including a screw extending downwardly through an aperture in one of said flanges and having a threaded portion for threadably receiving a nut to secure said electrical box to said flange, an O-ring carried by said threaded portion of said screw for preventing said screw from being dislodged in a vertical direction while said nut is being threaded onto said screw.

9. An extensible interjoist hanger support assembly for spanning between a pair of spaced apart ceiling joists having opposing surfaces, comprising:
    first and second telescopically extensible members movable in opposing axial directions between a fully collapsed length and a fully extended length;
    each said member having a free end carrying joist-engaging means for engaging one of said opposing surfaces of a pair of said joists; and
    first and second spacers respectively carried by said first and second extensible members for spacing said support assembly vertically above the upper surface of a ceiling by a fixed distance, said first spacer being mounted on said first extensible member to permit both axial and rotational movement of said extensible member relative to said spacer and said second spacer being mounted to said second extensible member to prevent rotational movement of said second extensible member relative to said second spacer.

10. An extensible interjoist hanger support assembly for spanning between a pair of spaced apart ceiling joists having opposing surfaces, comprising:

first and second telescopically extensible members movable in opposing axial directions between a fully collapsed length and a fully extended length;

each said member having a free end carrying joist-engaging means for engaging one of said opposing surfaces of a pair of said joists; and saddle bracket means releasable mounted on said support assembly and having a pair of outwardly extending flanges to which an electrical outlet box may be secured, fastening means for securing said outlet box to said flanges and including a pair of nut and bolt assemblies each including a screw extending downwardly through an aperture in one of said flanges and having a threaded portion for threadably receiving a nut to secure said electrical box to said flange, each said screw having an end cap and a shank portion between said end cap and said threaded portion, said shank portion being square shaped in cross section, each said aperture in each said flange being a square shaped aperture sized to receive the square shaped portion of said screw so as to prevent rotation of said screw about its longitudinal axis while said nut is being threaded onto said threaded portion, an O-ring carried by said threaded portion of said screw for preventing said screw from being dislodged in a vertical direction while said nut is being threaded onto said screw.

* * * * *